United States Patent [19]
Lurndal

[11] Patent Number: 6,167,430
[45] Date of Patent: Dec. 26, 2000

[54] MULTICOMPUTER WITH DISTRIBUTED DIRECTORY AND OPERATING SYSTEM

[75] Inventor: Scott Lurndal, San Jose, Calif.

[73] Assignee: Unisys Corporation, Blue Bell, Pa.

[21] Appl. No.: 09/076,482

[22] Filed: May 12, 1998

[51] Int. Cl.$^7$ .................................................. G06F 13/00
[52] U.S. Cl. ............................................................. 709/203
[58] Field of Search ................................... 709/201, 203, 709/212–214, 217–29

[56] References Cited

U.S. PATENT DOCUMENTS

| | | | |
|---|---|---|---|
| 5,519,875 | 5/1996 | Yokoyama et al. | 709/303 |
| 5,592,624 | 1/1997 | Takahashi et al. | 709/212 |
| 5,608,903 | 3/1997 | Prasad et al. | 707/10 |
| 5,659,701 | 8/1997 | Amit et al. | 709/304 |
| 5,802,298 | 9/1998 | Imai et al. | 709/217 |
| 6,014,690 | 1/2000 | VanDoren et al. | 709/215 |
| 6,026,474 | 2/2000 | Carter et al. | 711/202 |
| 6,044,438 | 3/2000 | Olnowich | 711/130 |

OTHER PUBLICATIONS

Division Marches Over To NDS Order, NetworkWorld, Nov. 27, 1995, p. 72.

*Primary Examiner*—Moustafa M. Meky
*Assistant Examiner*—Nkosi Trim
*Attorney, Agent, or Firm*—R. L. Adornato; M. T. Starr; L. A. Rode

[57] ABSTRACT

A method for creating a process in a multicomputer system that includes interconnected multiple sites. Each site includes a local processor, local memory, and a local operating system including a local process manager server that is addressable through an associated process port identifier. The operating system includes a messaging facility for controlling the transfer of messages between different processes on different sites. A process directory structure is distributed across multiple sites. The fragmented process directory structure includes a multiplicity of slots for referencing a multiplicity of process port identifiers. A procecss directory port group structure is provided in the site meemory of at least one of the sites, and references respective port identifiers associated with respective process managers on respective sites. A process directory port group manager is provided that is operative on at least one of the sites. A call is issued to a respective process manager server to request the creation of a new process operation. A first message is transferred from the respective process manager receiving the call to the process directory port group manager to request allocation of a slot. A second message is transferred from the process directory port group manager to a process manager associated with one of the port identifiers. The second message is a request to allocate a slot in the process directory fragment of the process manager receiving the second message. The new process creation operation is completed on the site that contains the process manager receiving the call.

5 Claims, 16 Drawing Sheets

MULTICOMPUTER WITH DISTRIBUTED DIRECTORY AND OPERATING SYSTEM

BACKGROUND OF THE INVENTION

1. Field of the Invention

The present invention relates generally to multicomputer systems, and more particularly, to such employing a microkernel-based serverized distributed operating system and to associated methods; as well as to such with a distributed process directory.

2. Description of the Related Art

Microkernel-based operating system architectures have been employed to distribute operating system services among loosely-coupled processors in a multicomputer system. In an earlier system, a set of modular computer software-based system servers sit on top of a minimal microkernel which provides the system servers with fundamental services such as processor scheduling and memory management. The microkernel may also provide an inter-process communication facility that allows the system servers to call each other and to exchange data regardless of where the servers are located in the system. The system servers manage the other physical and logical resources of the system, such as devices, files and high level communication resources, for example. Often, it is desirable for a microkernel to be interoperable with a number of different conventional operating systems. In order to achieve this interoperability, computer software-based system servers may be employed to provide an application programming interface to a conventional operating system.

The block diagram drawing of FIG. 1 shows an illustrative multicomputer system. The term "multicomputer" as used herein shall refer to a distributed non-shared memory multiprocessor machine comprising multiple sites. A site is a single processor and its supporting environment or a set of tightly coupled processors and their supporting environment. The sites in a multicomputer may be connected to each other via an internal network (e.g., Intel MESH interconnect), and the multicomputer may be connected to other machines via n external network (e.g., Ethernet for workstations). Each site is independent in that it has its own private memory, interrupt control, etc. Sites use messages to communicate with each other. A microkernel-based "serverized" operating system is well suited to provide operating system services among the multiple independent non-shared memory sites in a multicomputer system.

An important objective in certain multicomputer systems is to achieve a single-system image (SSI) across all sites of the system. From the point of view of the use, application developer, and for the most part, the system administrator, the multicomputer system appears to be a single computer even though it is really comprised of multiple independent computer sites running in parallel and communicating with each other over a high speed interconnect. Some of the advantages of a SSI include, simplified installation and administration, ease-of-use, open system solutions (i.e., fewer compatibility issues), exploitation of multisite architecture while preserving conventional API's and ease of scalability.

There are several possible component features that may play a part in a SSI such as, a global naming process, global file access, distributed boot facilities and global STREAMS facilities, for example. In one earlier system, a SSI is provided which employs a process directory (or name space) which is distributed across multiple sites. Each site maintains a fragment of the process directory. The distribution of the process directory across multiple sites ensures that no single site is unduly burdened by the volume of message traffic accessing the directory. There are challenges in implementing a distributed process directory. For example, "global atomic operations" which must be applied to multiple target processes and may have to traverse process directory fragments on multiples sites in the system. This traversal of directory fragments on different sites in search of processes targeted by an operation can be complicate by the migration of processes between sites in the course of the operation. In other words, a global atomic operation and process migration may progress simultaneously. Thus, there may be a particular challenge involved in ensuring that a global atomic operation is applied at least once, but only once, to each target process.

The problem of a global atomic operation potentially missing a migrating process will be further explained through an example involving the global getdents (get directory entries) operation. The getdents operation is a global atomic operation. The timing diagram of FIG. 2 illustrates the example. At time=t, process manager server "A" (PM A) on site A initiates a migration of a process from PM A on site A to the process manager server "B" (PM B) on site B (dashed lines). Meanwhile, an object manager server (OM) has broadcast a getdents request to both PM A and PM B. At time=t1, PM B receives and processes the getdents request and returns the response to the OM. This response by PM B does not include a process identification (PID) for the migrating process which has not yet arrived at PM B. At time=t2, PM B receives the migration request from PM A. PM B adds the PID for the migrating process to the directory fragment on site B and returns to PM A a response indicating the completion of the process migration. PM A removes the PID for the migrating process from the site A directory fragment. At time=t3, PM A receives and processes the getdents request and returns the response to the OM. This response by PM A does not include the PID for the migrating process since that process has already migrated to PM B on site B. Thus, the global getdents operation missed the migrating process which was not yet represented by a PID in the site B directory fragment when PM B processed the getdents operation, and which already has its PID removed from the site A directory fragment by the time PM A processed the getdents operation.

A prior solution to the problem of simultaneous occurrence of process migrations and global atomic operations involved the use of a "global ticket" (a token) to serialize global operations at the system level and migrations at the site level. More specifically, a computer software-based global operation server issues a global ticket (a token) to a site which requests a global operation. A number associated with the global ticket monotonically increases every time a new ticket is issued so that different global operations in the system are uniquely identified and can proceed one after the other.

Global tickets are used to serialize all global atomic operations so that they do not conflict among themselves. However, a problem remains between global operations and process migrations. A prior solution makes global operations result in a multicast message carrying the global ticket to process managers on each site. Each process manager would then acquire the lock to the process directory fragment of its own site and iterate over all entries. The global operation to the entry's corresponding process is only performed if a global ticket number marked on the entry is lower than the current iteration global ticket number. A global ticket number marked on a process directory fragment entry is carried over from a site the process migrates from (origin site) to a site the process migrates to (destination site). It represents the last global operation ticket such process has seen before the migration.

The migration of a process is a bit more complex. The process being migrated acquires the process directory fragment lock on its origin site first. It then marks the corresponding process directory entry as being in the process of migration. The migration procedure stamps the process' process directory entry with the present global operation ticket number, locks the process directory on the migration destination site and transmits the process directory entry contents to the destination site. The global operation ticket number on the destination site is then copied back in the reply message to the migration origin site. The migration procedure on the origin site is responsible for comparing the returned global ticket number from the target site and its own. If the global ticket number of the origin site is greater than the number from the target site, then the global operation already has been performed on the migrating process, although the operation has not yet reached the target site. The migration is permitted to proceed, but the process directory fragment slot for the migrating process on the target site is marked with the higher global ticket number. As a result, the global process will skip the migrated process on the target site and not apply the global operation twice to that process. If the global ticket number of the origin site is less than the number from the target site, then a global operation has been performed on the target site and has yet to be performed on the origin site and will miss the process currently being migrated. The migration will be denied and retried later.

Unfortunately, there have been problems with the use of global tickets (tokens) to coordinate global operations and process migrations. For example, the global ticket scheme serializes global operations since only one global operation can own the global ticket at a time. The serialization of global operations, however, can slow down overall system performance. While one global operation has the global ticket, other global operations typically block and await their turns to acquire the global the ticket before completing their operations.

Thus, there has been a need for improvement in the application of global atomic operations to processes that migrate between sites in a multicomputer system which employs a microkernel-based serverized operating system to distribute operating system services among loosely-coupled processors in the system. The present invention meets this need.

DETAILED DESCRIPTION OF THE PREFERRED EMBODIMENT

The present invention comprises a novel method and apparatus for process management in a multicomputer system employing a microkernel-based serverized distributed operating system. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing fro the spirit and scope of the invention. Thus, the present invention is not intended to be limited to the embodiment shown, but is to be accorded the widest scope consistent with the principles and features disclosed herein.

Microkernel-Based Distributed Operating System

Open distributed, scalable operating systems have been developed which are well suited to use in multicomputer architectures comprised of loosely-coupled multiprocessors. A presently preferred embodiment of the invention employs an operating system kernel known as CHORUS/MiX™ which provides a small kernel or nucleus onto which a distributed version of the UNIX operating system may be built as sets of distributed, cooperating servers. See, Benedicte Herrmann and Laurent Philippe, "CHORUS/MiX, a Distributed UNIX, on Multicomputers," Proceedings of Transputer '92, Arc et Senans, France, May 20–22, 1992. For instance, a UNIX SVR4 compatible operating system has been built using the CHORUS™ microkernel. See, Nariman Batlivala, et. A., "Experience with SRV4 Over CHORUS", Proceedings of the USENIX Workshop on Micro-Kernels and Other Kernel Architectures, Seattle, Wash., Apr. 27–28, 1992. In the CHORUS/MiX distributed operating system, each node of a multicomputer system, whether that node is a mono-processor or a multi-processor, runs a small microkernel which operates independently of any particular operating system. A set of system servers provide a conventional UNIX operating system interface. The combination of a low level nucleus and cooperating servers results in a modular "serverized" operating system which is well suited to distribution across a loosely coupled parallel computer architecture.

Figure 1:
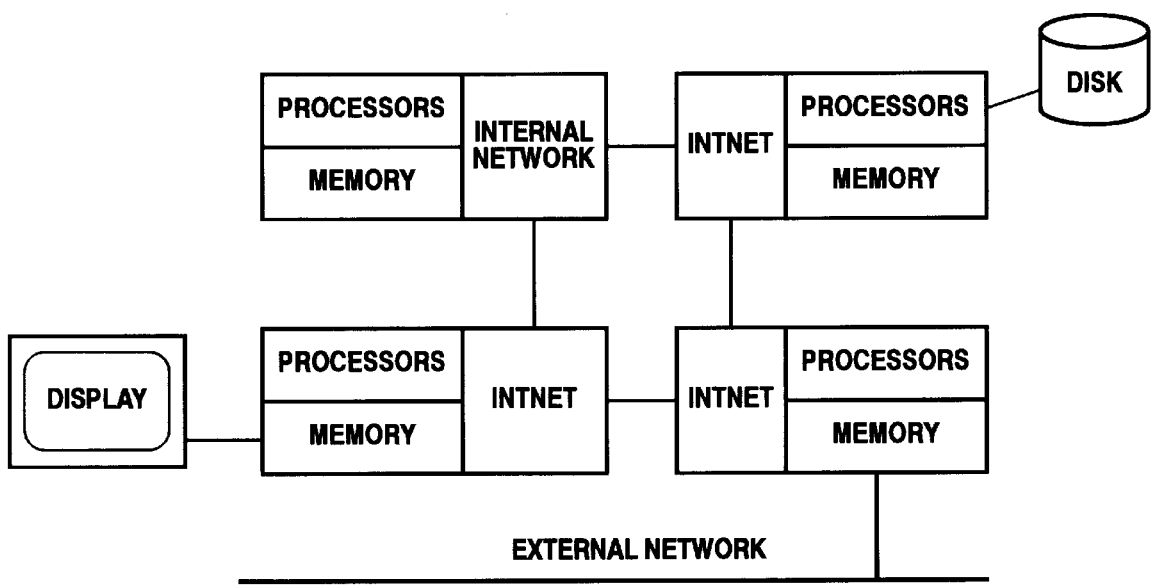
FIG. 1 is an illustrative block diagram of the hardware components of a known multicomputer system.
Figure 2:
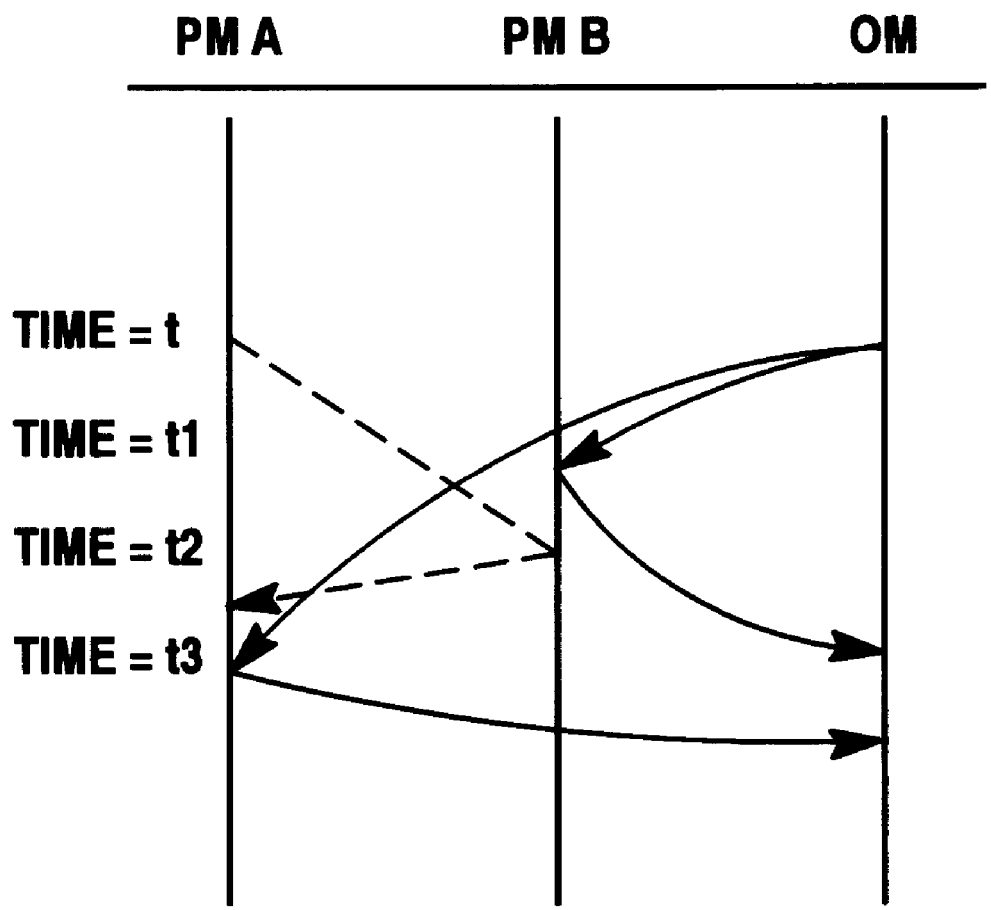
FIG. 2 is an illustrative timing diagram which demonstrates that a global atomic operation can miss a target process that migrates during performance of the operation.
Figure 3:
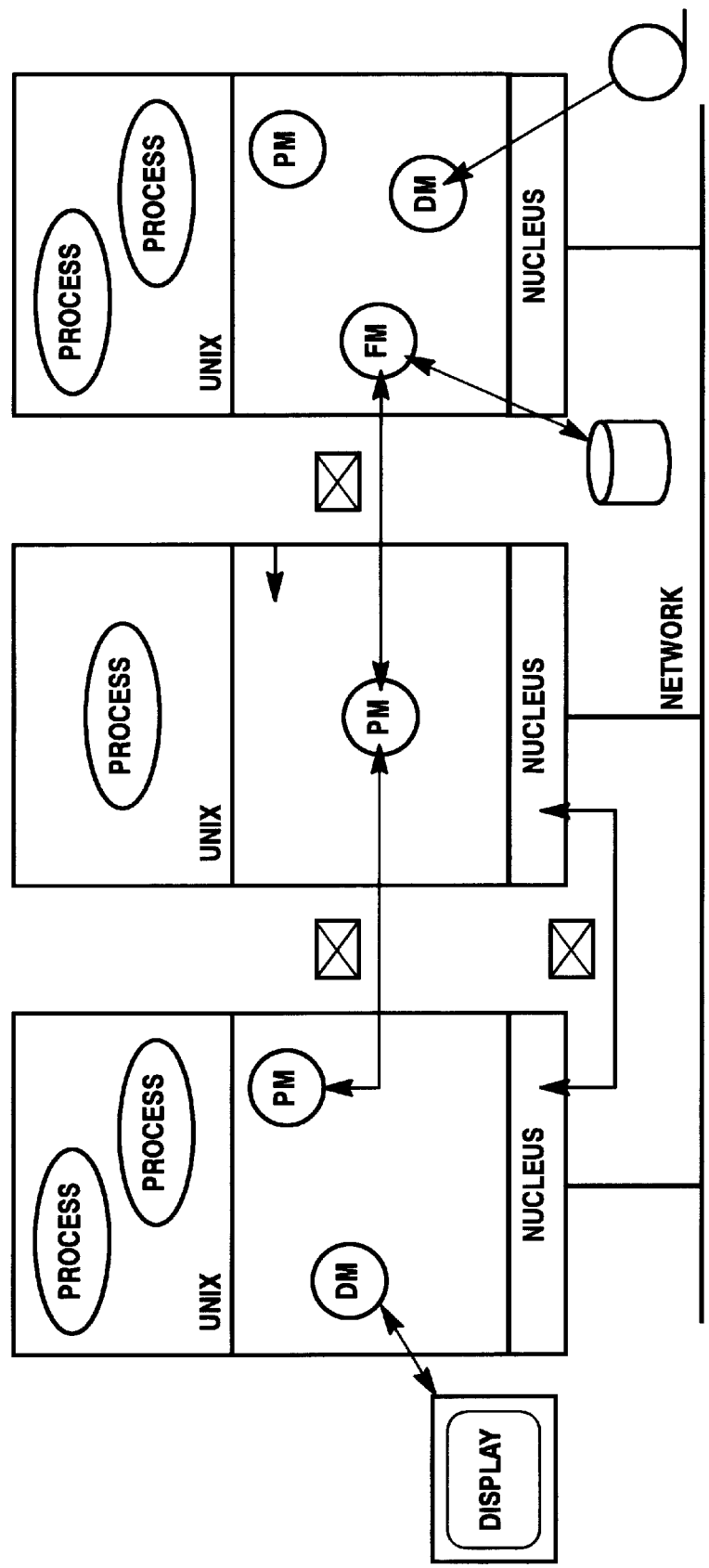
FIG. 3 is an illustrative block diagram that demonstrates the interaction of software based system server modules in a microkernel-based serverized operating system of the type employed by a presently preferred embodiment of the invention.

The illustrative block diagram of FIG. 3 shows an example of a multicomputer system which employs the CHORUS/MiX distributed operating system and in which three sites are interconnected by a communication network. CHORUS/MiX is comprised of the CHORUS nucleus and a UNIX subsystem. Each site includes a CHORUS nucleus (or microkernel) which performs low level activities such as, allocation of local resources, management of local memory, managing external events and which supports certain global services through basic abstractions referred to as, actors, threads, ports and messages described briefly below. Each site also includes one or more UNIX subsystem (SSU) servers. Each SSU server manages a different type of system resource (e.g., process, file devices, etc.). There are several types of servers in the SSU such as Process Manager (PM), File Manager (FM), Device Manager (DM), Socket Manager (SM), STREAMS Manager (STM), and IPC Manager. Interactions between servers, on a single site or on different sites, are based on the CHORUS nucleus Inter-Process Communications (IPC) facilities. STREAM files, such as pipes, network access, tty's, are managed by STM's.

A user application (user process) on given site interacts with the local Process Manager (PM) active on that site. In a current implementation, the local Pms provide a consistent UNIX SVR4 application program interface on each site and thereby provide a uniform application interface across the entire multicomputer system. More particularly, a PM on a given site handles all system calls issued by a process. The PM dispatches such requests to the appropriate servers. It implements services for process management such as the creation and destruction of processes or the sending of signals. The PM also manages the system context for each process that runs on its site. When the PM is not able to serve a UNIX system call by itself, it calls other servers, as appropriate, using the microkernel IPC. For example, upon receipt of a read(2) request, the PM generates a message to the FM which handles the request. Due to the transparency of the IPC employed by the microkernel CHORUS/MiX system, the FM may be located on a remote site. Vadim Abrossimov, et al., "A Distributed System Server for the CHORUS System," Proceedings of SDMS III, Symposium on Experiences with Distributed and Multiprocessor Systems, Newport Beach Calif., Mar. 26–27, 1992, explains interactions between certain servers operating with a CHORUS microkernel.

Figure 4:
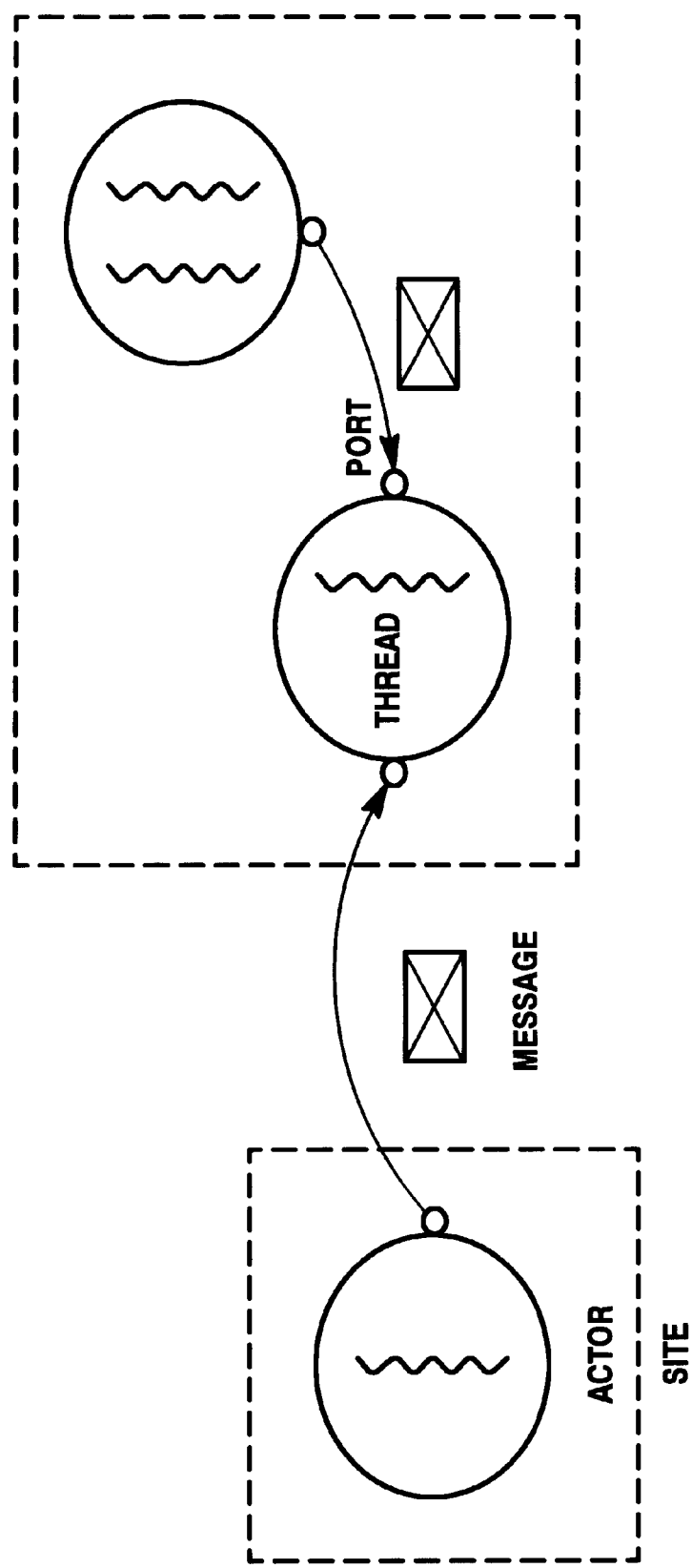
FIG. 4 is a generalized representation of certain global abstractions that are available in the operating system of FIG. 3.

The illustrative drawings of FIG. 4 display several abstractions employed in the microkernel which are useful in providing certain global services. These abstractions include an what is termed "actor" which is a collection of resources within a microkernel site. An actor may include memory regions, ports, and threads. When created, an actor contains only its default port. A "message" is an untyped sequence of bytes which represents information that can be sent from one port to another via the microkernel's IPC. The "inter-process communication" (IPC) is a facility that allows threads to exchange information in the form of collections of bytes called "messages." Messages are addressed to ports. The IPC mechanism is location transparent. Threads executing within an actor residing on different sites may use the IPC to exchange messages transparently. A "thread" is a flow of control within an actor in the system. Each thread is associated with an actor and defines a unique execution state. An actor may contain multiple threads. The threads share the resources of the actor, such as memory regions and ports and are scheduled independently. A "port" is an IPC entity. Threads send and receive messages on ports which are globally named message queues. Ports are named by unique identifiers (Uls). In fact, any resource within a CHORUSYMiX distributed operating system can be designated with a UI. There is a microkernel service that enables the microkernel to determine the site location of a resource (e.g., port, actor, file, process, etc.) which is represented as a UI. Ports are location transparent. A thread within an actor may send a message to the port of another actor without knowing the current location of that port. A "port group" is a collection of ports that are addressed as a group to perform some communication operation. Port groups can be used to send messages to one of a set of ports or to multicast messages to several ports simultaneously. A port can be a member of several port groups.

Process Directory Fragments of a Distributed Process Directory

Figure 5:
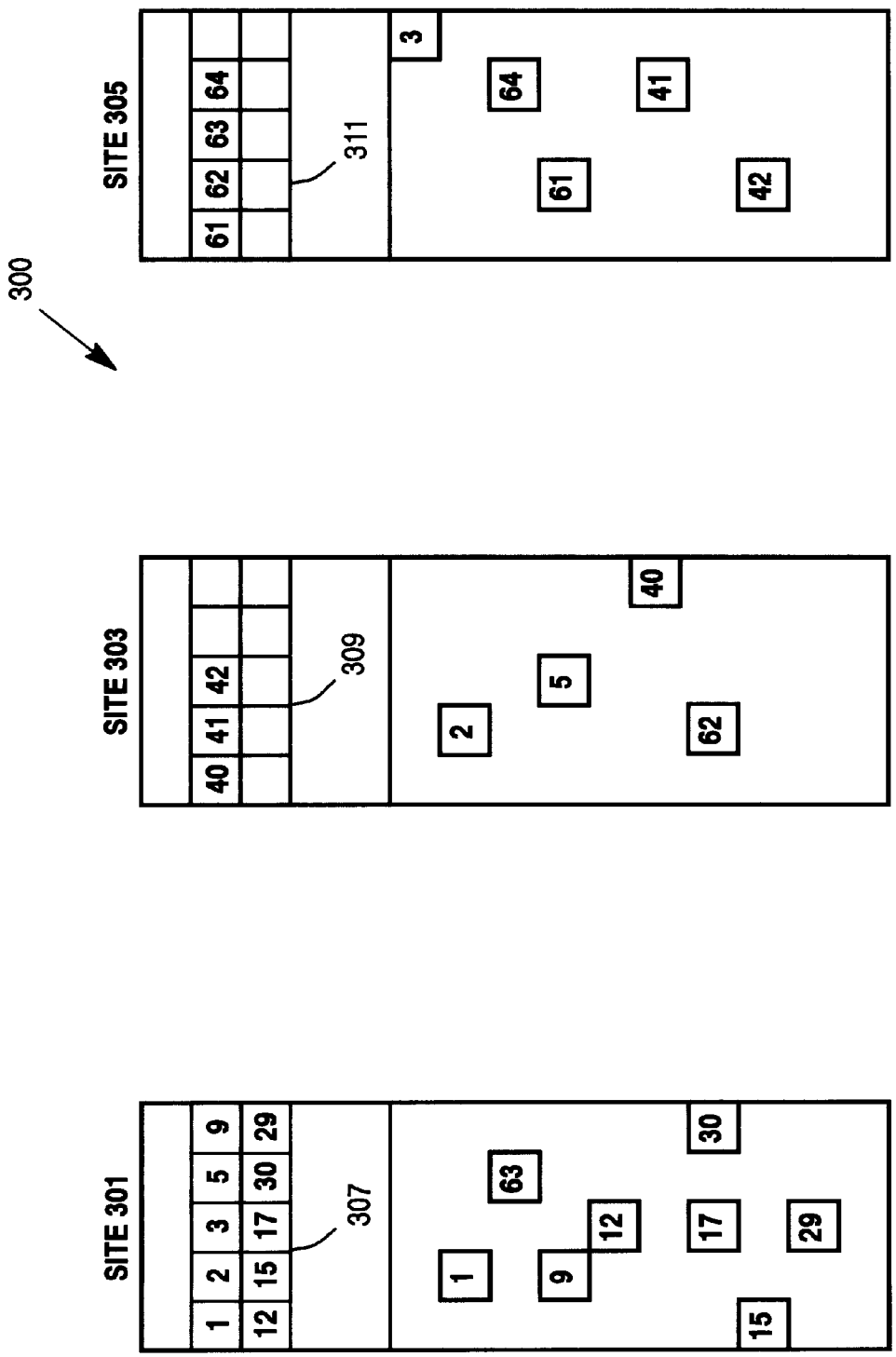
FIG. 5 is a generalized block diagram of three representative sites in s multicomputer system and the process directory fragments and process operative on those sites in accordance with a presently preferred embodiment of the invention.

FIG. 5 provides very simplified drawings of three sites (site 301, site 303 and site 305) in an exemplary multicomputer system in accordance with a presently preferred embodiment of the invention. It will be appreciated that an actual multicomputer system may employ far more than three site, and that each site may comprise a single processor or multiple processors. For the sake of simplicity, in explaining the preferred embodiment of the invention, however, the exemplary multicomputer system is shown with only three sites. The three sites share a distributed system process directory which is divided into three process directory fragments (PDFs). PDF 307 resides on site 301. PDF 309 resides on site 303. PDF 311 resides on site 305. Thus, each site stores a different fragment of the system process directory. Multiple user application processes run concurrently on the different sites. In a general sense, a "process" is a computer software-based entity that occupies a portion of a computer system's electronic memory and that involves a scheduleable event. Processes identified by process identifications (PIDs) 1, 9, 12, 15, 17, 29, 30 and 63 run on site 301. Processes identified by PIDs 2, 5, 40 and 62 run on site 303. Processes identified by PIDs 3, 41, 42, 61 and 64 run on site 302. PDF 307 which resides on site 301 stores PIDS 1, 2, 3, 5, 9, 12, 15, 17, 30 and 29. PDF 309 which resides on site 303 stores PIDs 40, 41 and 42. PDF 311 which resides on site 305 stores PIDs 61, 62, 63 and 64.

Figure 6:
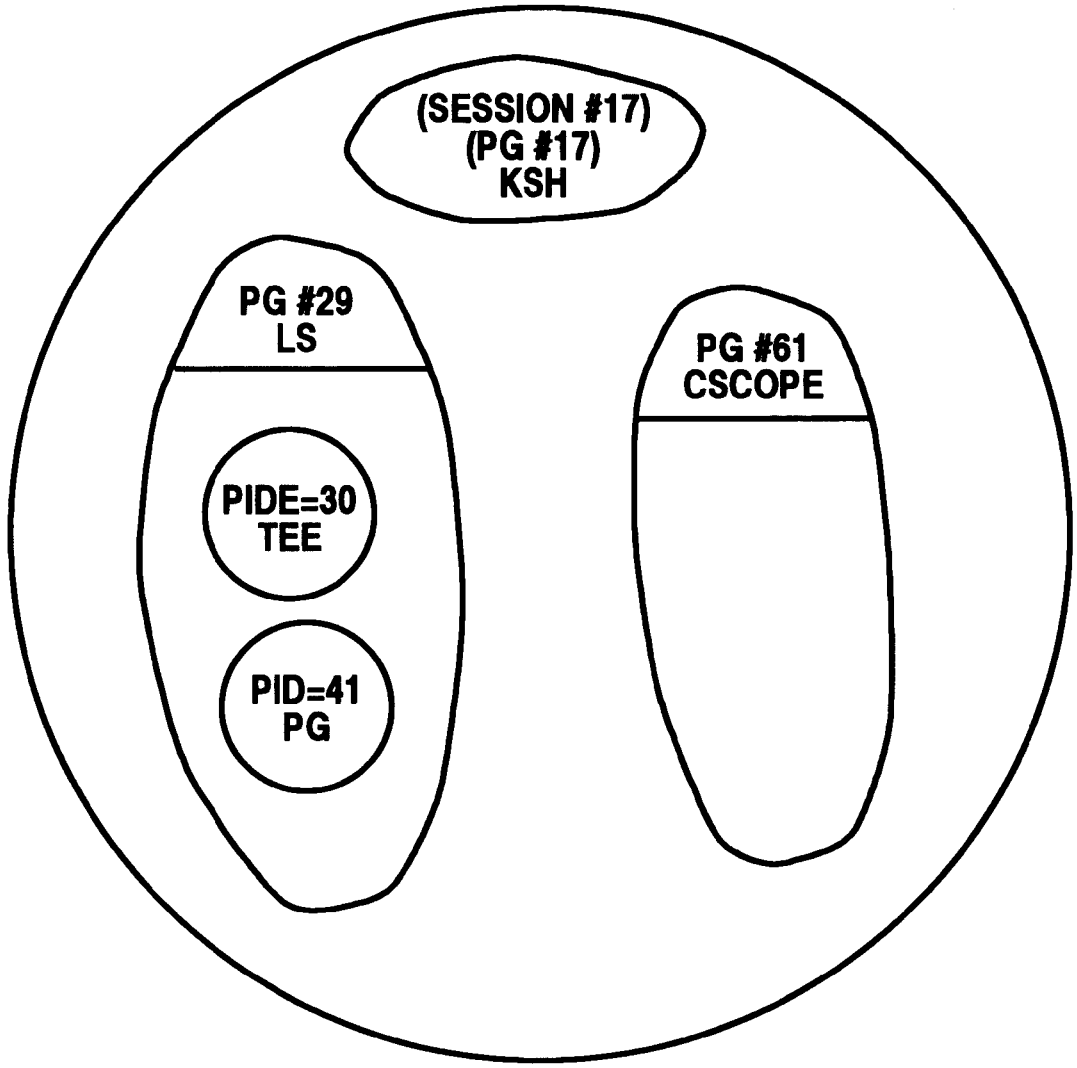
FIG. 6 is an illustrative drawing showing exemplary session and process group relationships among the processes depicted in FIG. 5.

The illustrative drawings of FIG. 6 shows an example of possible relationships among some of the processes in FIG. 5. In particular, the system hosts a session with multiple process groups operative on different system sites. Moreover, the session's process groups themselves include multiple processes operative on different system sites. For instance, PID 17 might correspond to a command process which creates a session which includes multiple process groups. A first process group in the session might be identified by the process corresponding to PID 17. A second process group in the session might be identified by the process corresponding to PID 29. A third process group in the session might be identified by the process corresponding to PID 61. The first process group corresponding to PID 17 might include only a single process identified by PID 17. The second process group corresponding to PID 29 might include three processes identified by, PID 29, PID 30 and PID 41. The third process group corresponding to PID 61 might include only a single process, PID 61.

The exemplary session might be further specified by the following program instructions.

```
/*
*Session (17) process group (17)
*/
       ksh/* (PID17) */
/*process group (29)*/
           ls - lr | tee | pg /*(PIDs 29, 39 and 41)*/
/*process group (61)*/
               cscope -d -f rdbms /* (PID 61)*/
``` ksh is the Korn shell command which is a standard UNIX system command interpreter.

ls is the list files command.

tee is a command to make two copies of an input, one to a file, the other to output.

pg is an output pager command which displays input to output one page at a time.

cscope -d -f rdbms its is a related command.

Referring to FIGS. 5 and 6, it will be appreciated that Session 17 is divided between site 301 and site 305. Session 17 includes three process groups, 17, 29 and 61. Process group 17, with its single process corresponding to PID 17, resides entirely on site 301. Process group 29 is divided between site 301 and site 305: the processes corresponding to PID 29 and PID 30 reside on site 301; and the process corresponding to PID 41 resides on site 305. Process group 61, with its single process corresponding to PID 61, resides entirely on site 305.

Process Creation

Figure 7A:
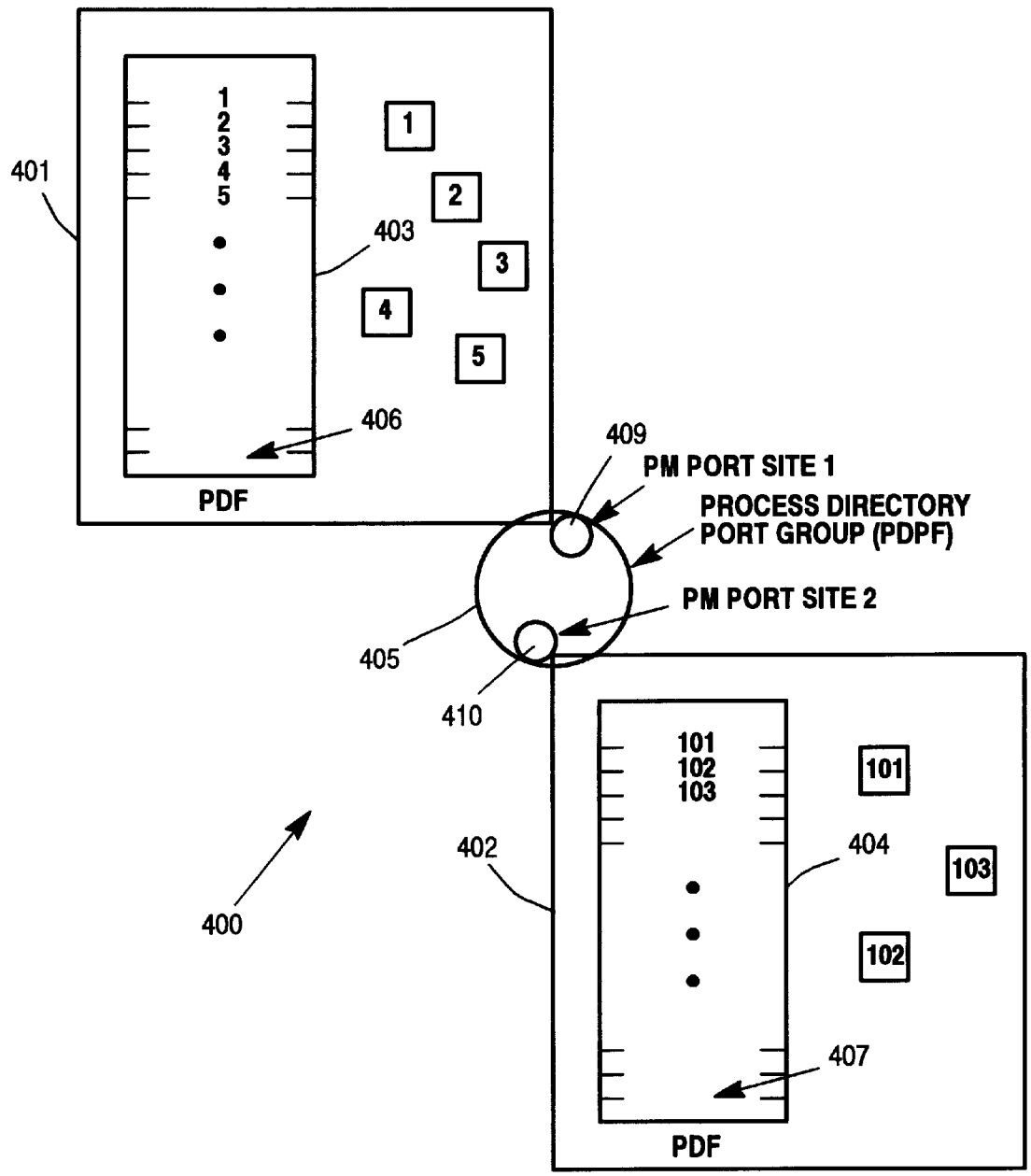
FIGS. 7A–7D are generalized block diagrams of two representative sites in a multicomputer system and the process directory fragments and processes operative on those sites used to illustrate process creation (FIGS. 7A–7C) and process migration (FIGS. 7A–7D) in accordance with the presently preferred embodiment of the invention.

Process creation in accordance with a present implementation of the invention shall be explained with reference to the illustrative drawings of FIGS. 7A, 7B and 7C. In particular, for example, the creation of a new child process PID 6 shall be explained. Referring to FIG. 7A, there is shown a very simplified representation of an exemplary multicomputer system 400 in accordance with a presently preferred embodiment of the invention. In this example only two sites are shown, site 401 and site 402. Site 401 includes a PDF 403, and site 402 includes a PDF 404. There are five active user application processes on site 401. They are identified by PIDs, 1, 2, 3, 4 and 5. Each of these five processes was created locally on site 401 and has not migrated. There are also three active user application processes on site 402. They are identified by PIDs, 101, 102 and 103. Each of these three processes was created locally on site 402 and has not migrated.

A process directory port group (PDPG) 405 is associated with process directory fragments (PDFs) 403 and 404. The PDF 403 that resides on site 401 includes empty slots 406, and the PDF 404 that resides on site 402 includes empty slots 407. Thus, in accordance wit the present embodiment of the invention, both the PM port 409 for site 401 and the PM port 410 for site 402 are included in the PDPG 405.

Figure 7B:
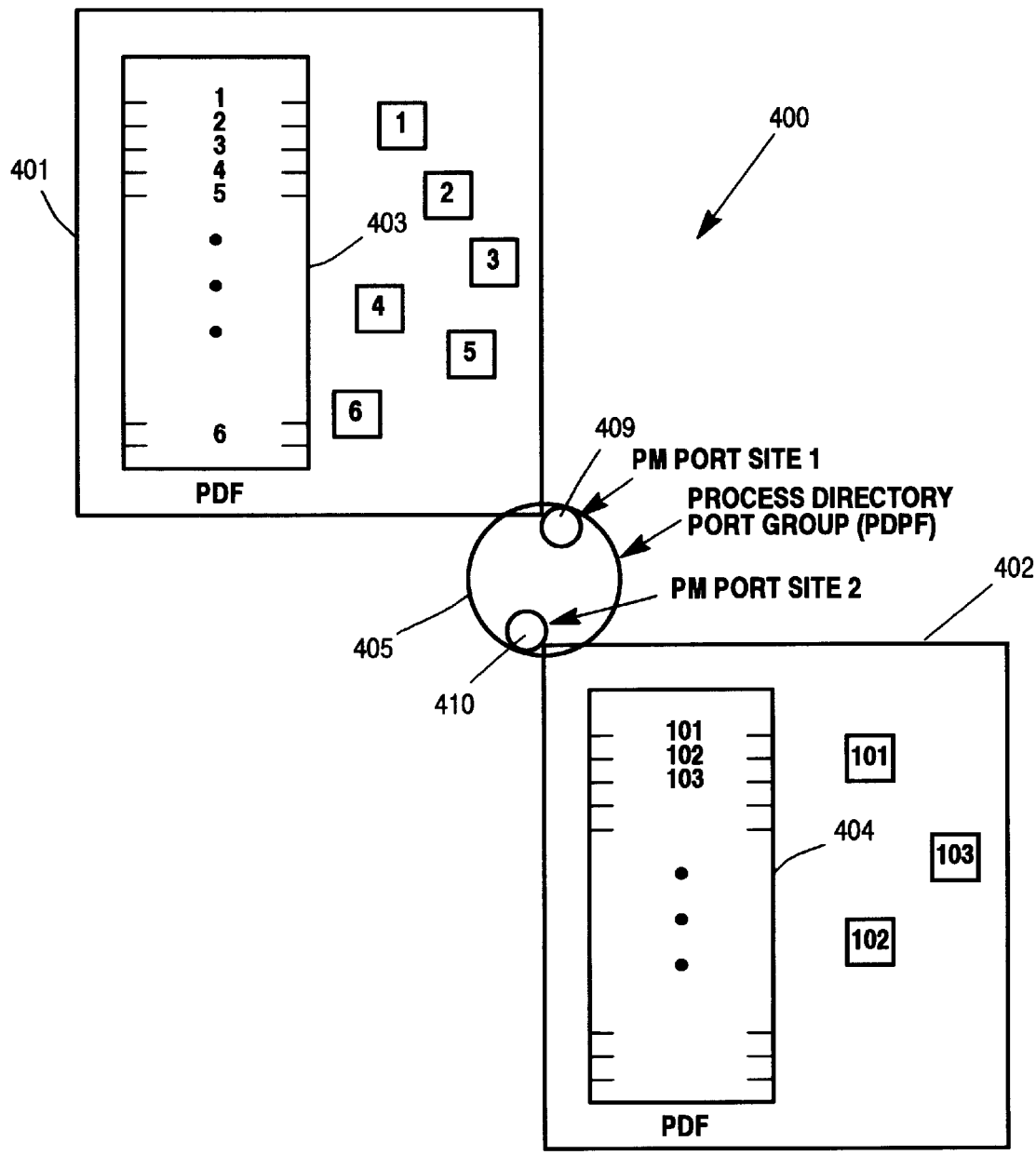
Figure 7C:
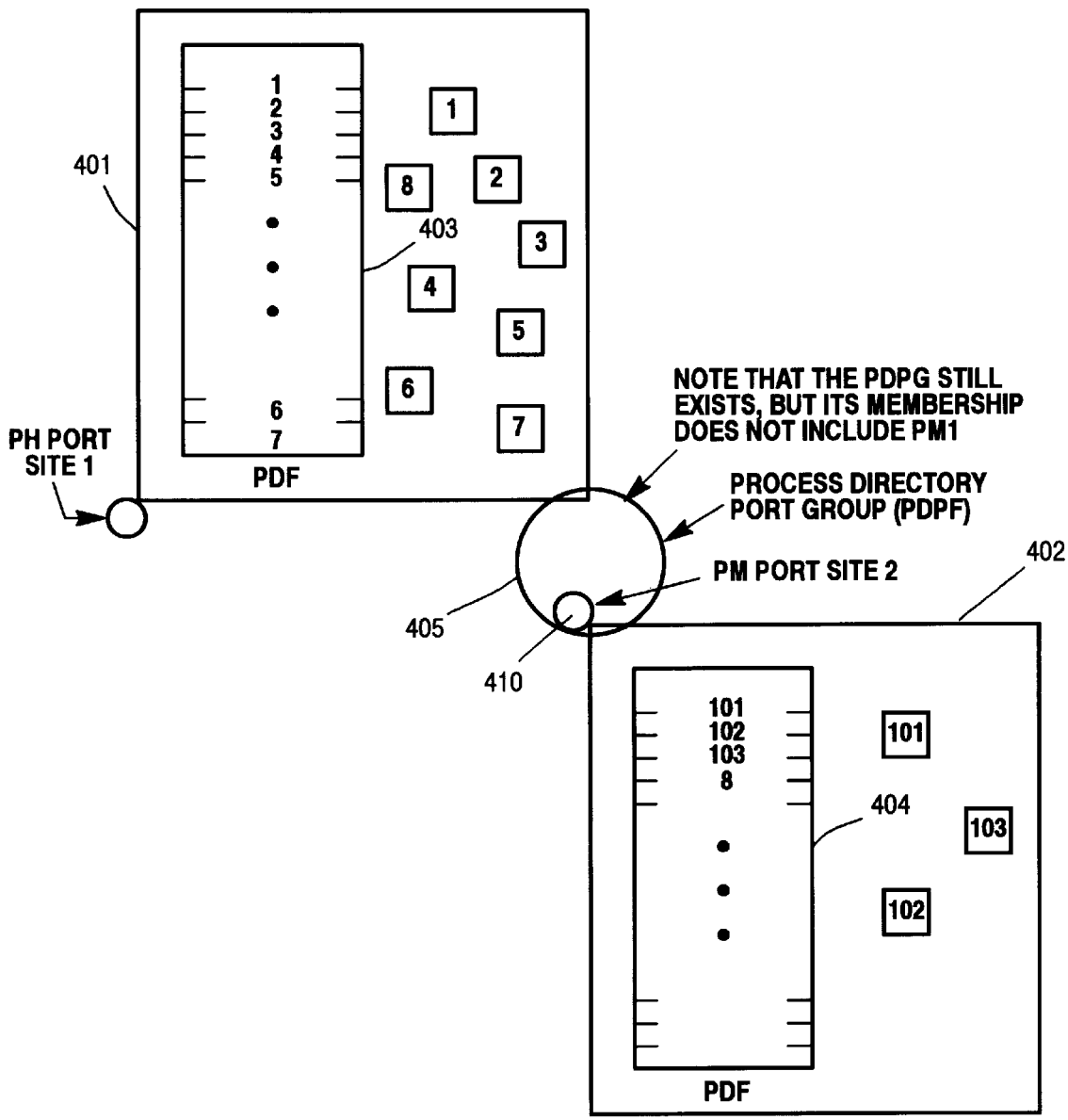

As shown in FIG. 7B, assume, for example, that process PID 3 on site issues a fork( ) operation to create a child process PID 6. The PM (not shown) on site 401 fields the fork( ) system call. The PM on site 401 sends an "allocate slot request" message to the PDPG 405 using the CHORUS microkernel associative functioial mode and provides its own port (PM port 409 ) as the "CoTarget." The associative functional mode is a standard CHORUS facility group in which a message designates one port in a port group as the CoTarget for the message. If the CoTarget port is present within the port group (in this case the PDPG 405 ) then the message is delivered to that port. If the CoTarget port is absent form the port group, then another port in the port group is automatically selected to receive the message. In this example, PM on site 401 receives its own "allocate slot request" message; assigns PID number "6 " to the new process; assigns a slot to the new process PID 6 and returns a successful reply. The PM on site 401 receives the reply; stores the slot index and site 401 PM Port's unique identifier (UI) in the processes data structure for the new child process PID 6. The fork( ) operation completes normally.

The creation of another new child process identified by PID 8 shall be explained with reference to FIGS. 7b and 7C. The creation of process PID 8 is complicated by the Fact that the PDF 403 on site 401 has no vacant slots at the time of the creation of this new process PID 8. In particular, the PDF 403 is filled with PIDs 1, 2, 3, 4, 5, 6 and 7. Assume that process PID 3 o site 401 issues a fork( ) operation to create a child process PID 8. The PM (not shown) on site 401 fields the fork( ) system call. The PM on site 401 sends an "allocate slot request" message to the PDPG 405 using Chorus associative functional mode and providing it own port (PM port 409 ) as the CoTarget. Since, in FIG. 7C, all of the slots on site 401 are filled, the PM port 409 is not a part of the PDPG 405. The PM (not shown) on site 402 receives the request; assigns a slot; stores the new child process PID 8; and returns a successful reply. The PM on site 401 receives the reply; stores the slot index and the site 402 PM Port's User Interface (UI) in the process structure for the new child process PID 8. The fork( ) operation completes normally.

In the presently preferred embodiment of the invention, the PID for a process created on a given site remains in the PDF of that creation site even if the process subsequently migrates to another site. Each site also maintains a "bookkeeping" process data structure for each process currently active on the site. Each such active process data structure includes information regarding the session membership and the process group membership of such process as well as the PM UI for the site that contains the process' PID and the actual PDF slot number that contains the process' PID. When the data structure corresponds to a process that is a session leader or a process group leader, then the data structure indicates whether or not the entire membership of the session or process group is resident on the site with the corresponding process. In the current implementation, the active process data structures are maintained in a doubled linked list structure.

Figure 8:
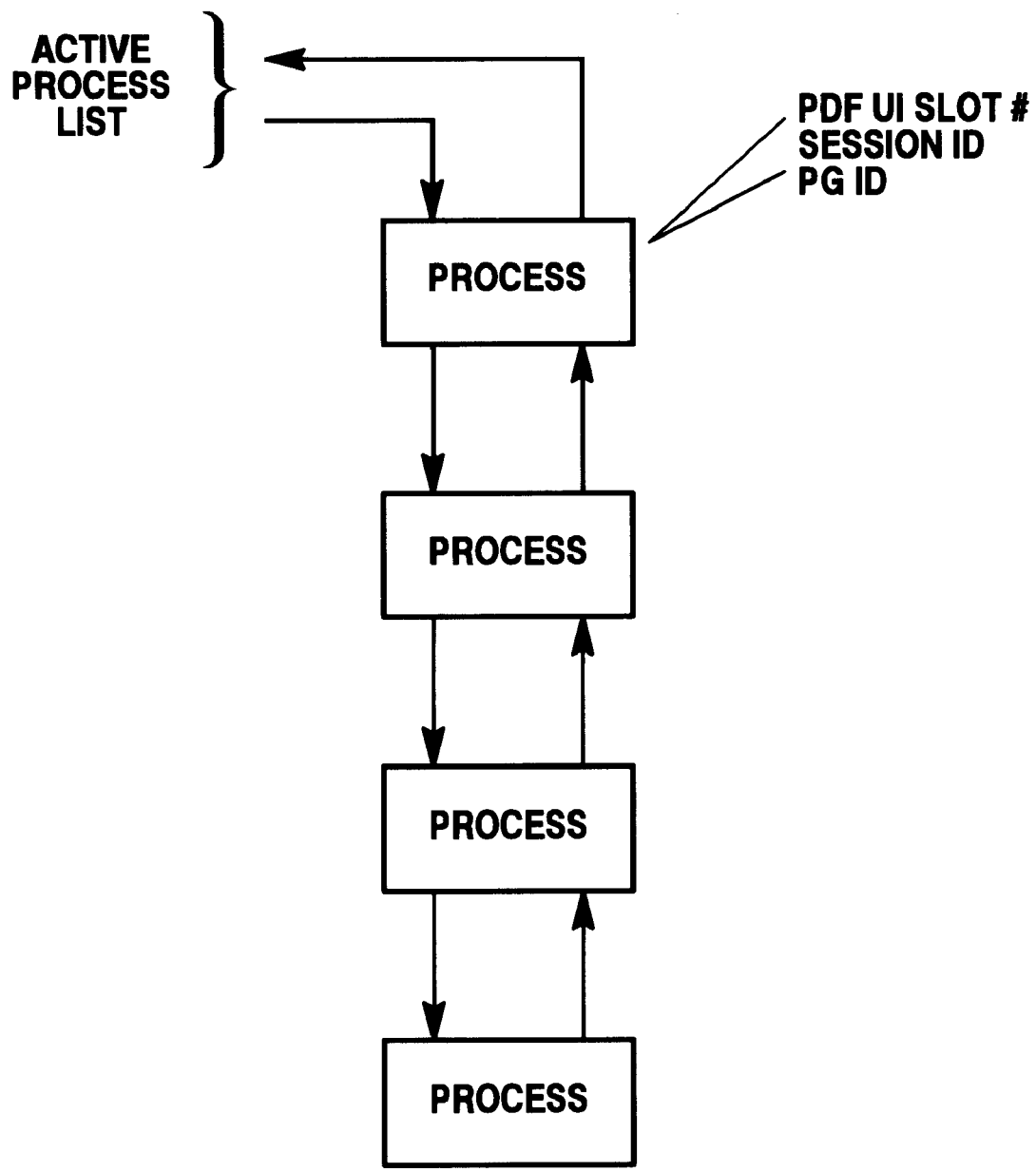
FIG. 8 is an illustrative diagram of a double linked list of bookkeeping data structures maintained on a site in which each respective data structure corresponds to a respective process active on the site that maintains the list in accordance with a presently preferred embodiment of the invention.

FIG. 8 provides a generalized representation of a double linked list structure maintained on a given site which comprises a plurality of active process data structures that correspond to the processes currently active on the given site. Each respective site maintains its own double linked list structure for the processes currently active on such respective site. As processes migrate to an from a given site, corresponding active process data structures corresponding to such migrating processes are added to or depart from the double linked list structure maintained by that given site. However, except in the case of site failure, as explained below, the PID for any given process is always associated with the same slot on the site that created the given process. In this sense, the slot and PDF assignment of a given process PID is immutable.

Thus, when a process migrates from one site to another site, the PID of the migrating process remains assigned to the PDF slot originally assigned to such migrating process. However, an active process data structure associated with the migrating process departs the site when the process migrates away from (the origin site) and is set up on the site on which the process migrates to (the destination site). This active process data structure identifies the slot in the PDF on which the migrating process originated and which still maintains the PID of such migrating process. As a result, as explained below, multiple global atomic operations can progress in parallel in spite of process migrations during the performance of such global atomic operations without missing migrating processes and without operating twice on a migrating process. Therefore, overall system performance is less severely impacted by the performance of global atomic operations involving processes running on different sites in the multicomputer system.

The use of PIDs rather than memory addresses in the PDF slots advantageously facilitates accessing a process through its PID which corresponds to the CHORUS microkernel unique identifier (UI) for the port associated with the process. As a result, the PDF slot need not be updated as a process identified by a particular PID in the slot migrates from site to site. Rather, a CHORUS microkernel facility automatically keeps track of a process' memory address as it moves between sites within the multicomputer system.

Process Migration

Figure 7D:
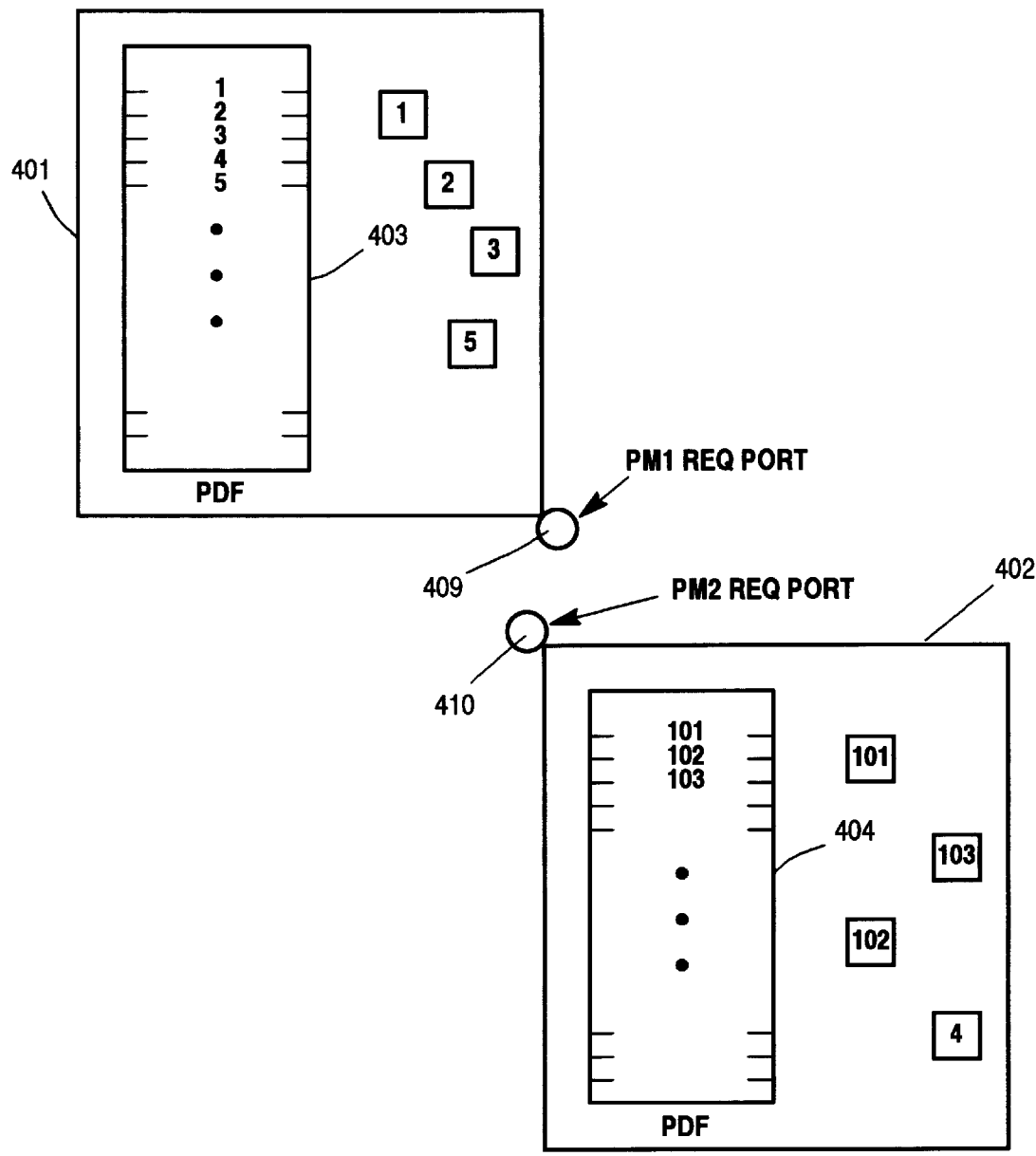

Process migration from site to site within a multicomputer system in accordance with a current embodiment of the invention shall be explained with reference to the illustrative drawings of FIGS. 7A and 7D. In particular, for example, assume that process PID 4 migrates from site 401 to site 402. A migration request is received by the PM on site 401 to migrate the process PID 4 to site 402. The migration request might be issued by a system administrator, a load balancer process or a user application, for example. The process PID 4 receives the request and marshals the migrating process' state into a message and sends it to the site 402 PM request port 410. The state information includes all information used to operate the process. This information might include, for example, memory contents, registers, multiple thread descriptions, and the bookkeeping process data structures. The PM on site 402 constructs the bookkeeping data structures and inserts them into a linked list structure like that shown in FIG. 8. The PM on site 402 also creates the appropriate global services entities (e.g., thread, actor, address space). Furthermore, the PM on site 402 requests that the microkernel migrate the process port UI for process PID 4 to site 402. The PM on site 402 sends a message to the site 401 PM indicating success or failure of the migration request. If the migration has been successful, then the PM on site 401 destroys the old copy of the migrated process. The PM on site 402 starts the new copy of the process PID 4.

It will be appreciated that the PID of the migrated process does not migrate with the process itself. The PID for the migrated process resides in the same PDF slot before and after the migration. Thus, a global atomic operation iterating through the slots of the various PDFs will not miss a migrating process or operate on it twice since the process PID slot assignment is immutable. The bookkeeping process data structure created on the destination site includes the PM UI for the site that contains the process' PID and the actual PDF slot number that contains the process' PID. Thus, the bookkeeping data structure can be employed to ascertain the PID for the migrated process, for example. The microkernel keeps track of the location in the multicomputer system of the process port UI for the migrated process PID. Thus, the microkernel can be employed to direct messages to the migrated process based on the process' PID, for example.

Globally Atomic Operations

Figure 9A:
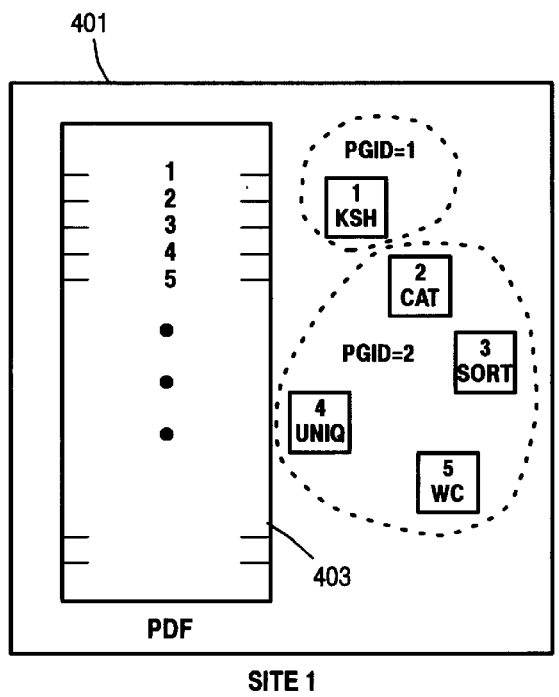
FIGS. 9A–9B are generalized block diagrams of two representative sites in a multicomputer system and the process directory fragments and processes operative on those sites used to illustrate global atomic operations in accordance with a presently preferred embodiment of the invention.
Figure 9A:
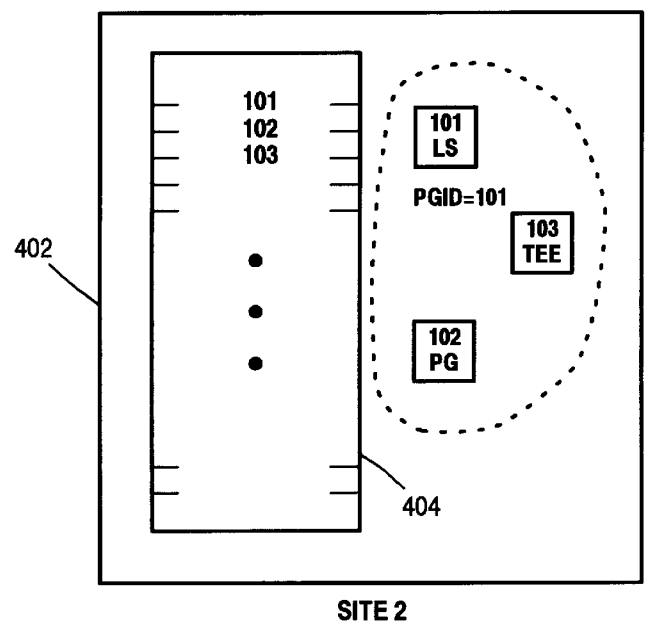
Figure 9B:
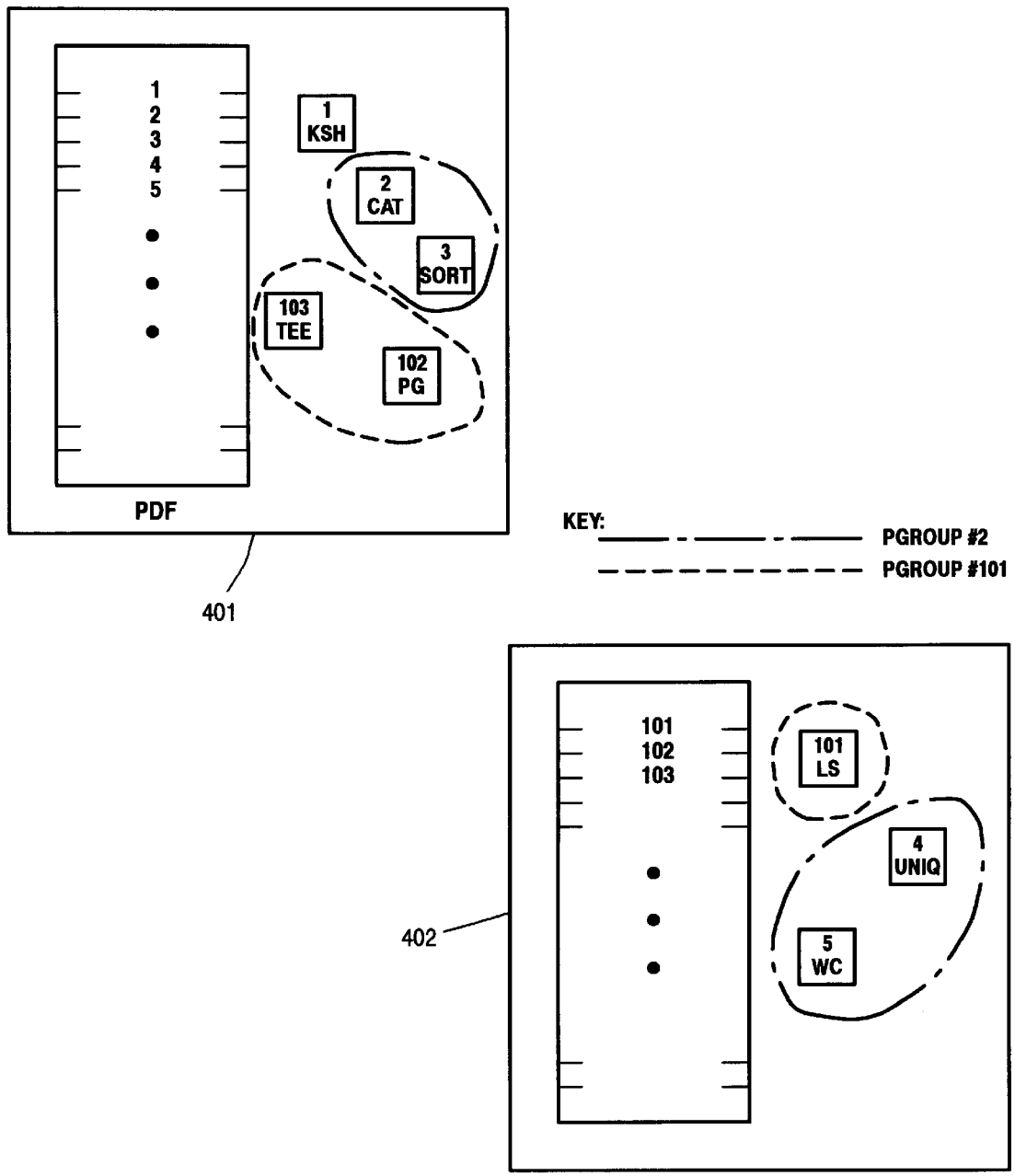

A globally atomic operation is of interest here. The performance of globally atomic operations according to a present implementation of the invention shall be explained with reference to the illustrative drawings of FIGS. 9A and 9B and FIG. 10. An advantage of the process employed to implement a globally atomic operation in accordance with the present invention is that such is done securely. The multicomputer system 400 of FIGS. 9A and 9B are the same as those discussed above with reference to FIG. 7A. However, FIGS. 9A and 9B illustrate exemplary relationships among the user application processes operative on sites 401 and 402.

Figure 10:
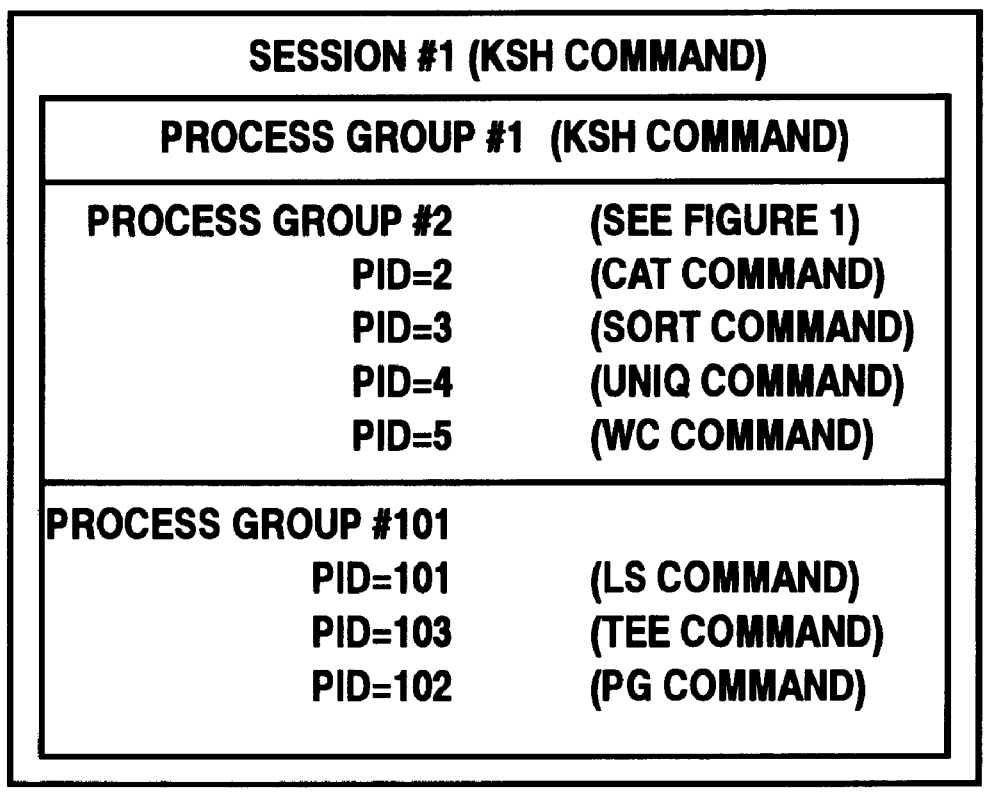
FIG. 10 illustrates session and process group relationships among the processes in FIGS. 9A–9B.

FIG. 10 further illustrates the relationships among the various exemplary processes running on sites 401 and 402. Specifically, session number 1 includes process groups identified by process group identities (PGIDs) 1, 2 and 3. Process group PGID 1 includes the process with PID 1. Process group PGID 2 includes processes with PIDs 2, 3, 4 and 5. Process group PGID 101 includes the processes wit PIDs 101, 102 and 103.

The process PID 1 is a command processor (ksh) which serves as the session leader. The session includes two pipelines, each of which becomes a process group within the session. Exemplary UNIX instructions used to produce the session are set forth below for each of the three process groups.

```
/*PGID 1:*/
    $ ksh /* (PID 1)*/
/*PGID 2:*/
    $ cat/etc/terminfo | sort | uniq | wc - 1 & /*(PIDs 2, 3, 4 and 5)*/
/*PGID 101:*/
    $ ls -lr | tee | pg & /*(PID5 101, 102 and 103)*/
```

Process group PGID 1 consists of a single process group, whose leader is the ksh command. Process group PGID 1 also serves as the session leader.

ksh is the Korn shell command which is a standard UNIX system command interpreter.

Process group PGID 2 consists of a single process group, whose leader is the cat command.

cat is the catenate command. It will read the contents of file "etc/terminfo" and write the contents to the standard output (which in this example is a pipe as indicated by the vertical bar "|" symbol).

sort is the sort command. It will read the data from the pipe, sort it, and then write the sorted data to its output (another pipe).

uniq is the unique command. It will read data from the input pipe, remove any duplicate adjacent lines (which sort would have sorted into adjacent lines) and write the remaining lines to its output (yet another pipe).

wc is the count command. The -1 option requests that wc produce a count of lines read from its input pipe. This count will be written to its output, which will be the controlling terminal.

& instructs the ksh to put the process group in the background.

Process group PGID 3 consists of a single process group, whose leader is the ls command.

ls is the list files command.

tee is a command to make two copies of an input, one to a file, the other to output.

pg is an output pager command which displays input to output one page at a time.

Assume, for example, than an administrator issues the following command on site 401:

$ skill-term session 1* skill is a nonstandard UNIX command which sends signals to an entire session. The "-term session 1" designation indicates that a terminate signal is to be sent to all processes in session 1.

The site 401 PM receives the skill signal request via the system call interface. This receiving PM determines that the target is the group of processes in session 1, and multicasts a message to all Pms instructing them to deliver sigterm (a software termination signal) to all members of session 1. Each PM, upon receiving the sigterin request, will iterate through its PDF slots. For each PID, it sends a sigterm request to the corresponding process instructing it to deliver sigterm if the process is a member of session 1. The microkernel ensures that the request is delivered to the appropriate processes based upon their process PIDs. Each such process, in turn checks its bookkeeping data structure to determine whether or not is a member of session 1. The site 401 PM, the original PM caller, collects responses from the processes that received the sigterm request and prepares a return to the caller of the sigterm call.

In the presently preferred embodiment of the invention, a globally atomic operation against a session or a process group that is entirely local does not require a multicast. Visualize this as a two step process—First a determination is made as to whether all session and process group processes are local; If they are, then sigterm is delivered locally. If they are not, then sigterm is multicast. For example, the bookkeeping data structure for the session leader ksh will contain an indication as to whether or not the entire membership of the session and the process group PGID 1 for which ksh is the leader is contained on site 401. In the situation illustrated in FIG. 9A, the indication would not that the process group (which consists solely of ksh itself) in fact local to site 401. Additionally, since the process group PGID 101 is on site 402, there would be an indication that the session is not local to site 401. Consequently, a globally atomic operation directed to session 1 requires multicast, but a globally atomic operation directed to process group PGID 1 would not require multicast. Similarly, respective bookkeeping data structures for process groups PGIDs 2 and 101, as shown in FIG. 9A, would respectively indicate that all of the member processes of process group PGID 2 are local to site 401, and that all of the process members of process group PGID 101 are local to site 402. Consequently, globally atomic operations directed against either of process groups PGIDs 2 or 101 would not require multicast.

FIG. 9B shows the same session and process groups of FIG. 9A after various members have migrated. Specially, the user application processes corresponding to PIDs 4 and 5 have migrated to site 402, and the user application processes identified by PIDs 102 and 103 have migrated to site 401. Globally atomic operations to members of either process group PGID 2 or process group PGID 101 require multicast operations because the members of process groups PGIDs 2 and 101 are divided among sites 401 and 402. Globally atomic operations to process group PGID 1, however, can be handled locally by the site 401 PM, since the sole process in PGID 1 is on site 401.

A PM that receives the globally atomic sigterm operation described in the above example uses PIDs to identify processes to be operated upon without sigterm request to knowing the site on which the corresponding process actually runs. The microkernel keeps track of the actual location of a process even when the pr 6 cess migrates fro one site to another, and, therefore, there is no need to the PID of a migrating process to migrate with the process itself. Since PIDs remain in the same slots regardless of process migration, there is not a risk that a globally atomic operation that keeps track of which processes it has already operate upon, and which processes it has not yet operated upon, based upon the prograss of the operation's iteration through PDF slots, will miss target process or operate twice on target processes that have migrated. Thus, it is not necessary to serialize globally atomic operations in view of the possibility of process migration. These global operations may occur in parallel which ensures a limited impact on overall system performance even if many such operations occur simultaneously.

Site Failure

Figure 11A:
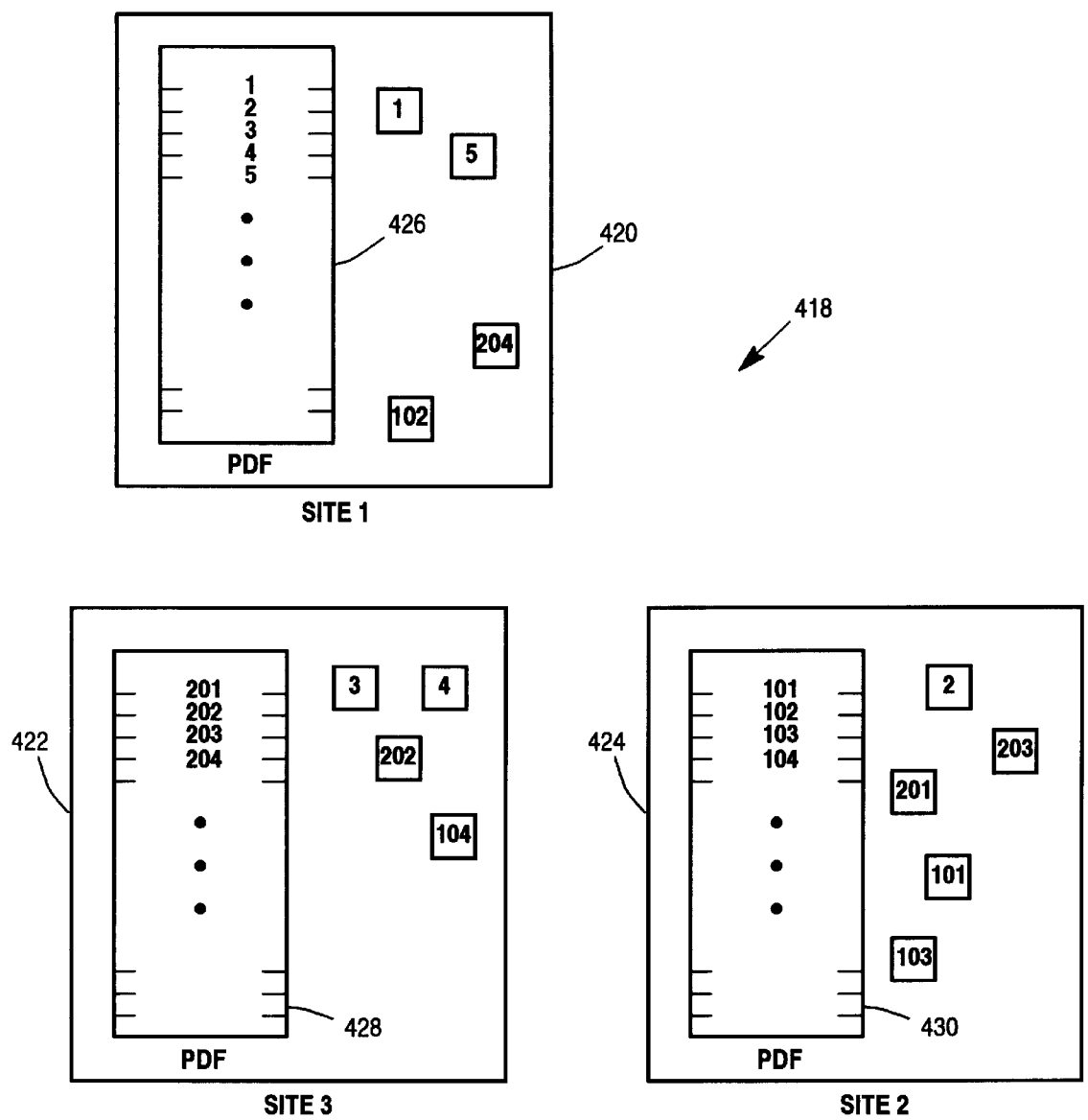
FIGS. 11A–11B are generalized block diagrams of two representative sites in a multicomputer system and the process directory fragments and processes operative on those sites used to illustrate site failure recovery in accordance with a presently preferred embodiment of the invention.

Referring to the illustrative greatly simplified drawings of FIG. 11A, there are shown three sites of an exemplary multicomputer system 418 in accordance with a presently preferred embodiment of the invention. Site 420 includes PDF 426 which stores PIDs 1, 2, 3, 4 and 5. The user processes that correspond to PIDs 1, 5, 102 and 204 run on site 420. Site 422 includes a PDF 428 which stores PIDs 201, 202, 203 and 204. The user application processes that correspond to PIDs 2, 101, 103, 201 and 203 run on site 424.

The current embodiment of the invention provides processes and associated structures in electronic memory to facilitate recovery of processes in the event that a site in the multicomputer system 418 fails. Assume, for example, that site 422 experiences a failure and is no longer operative. The failure of site 422 will be detected to notify the other sites of the site 422 failure. In accordance with a current embodiment of the invention, the Pms on each of the surviving sites, site 420 and site 424, check the respective process data structures for each process running on such surviving sites to identify those surviving processes that correspond to a PID that was managed by a slot in the PDF 428 of failed site 422. A list of these identified processes is sent to a PM on a site chosen to mange the PDF for the failed site 422. In this example, site 424 has been chosen (at random) to host the reconstruction of the fragment of the process directory lost when site 422 failed. Referring to the illustrative drawing of FIG. 11B, there is shown the multicomputer system 418 with only surviving sites, site 420 and site 424. The chosen PM will attempt to reconstruct the PDF 428 of the failed site 422 and will manage it as if it was part of the failed site 422 ("as if it was part of the failed site 422"). However, since the processes that had been running on site 422 have been lost, only deallocation requests are processed for the reconstructed PDF 428 '.

Figure 11B:
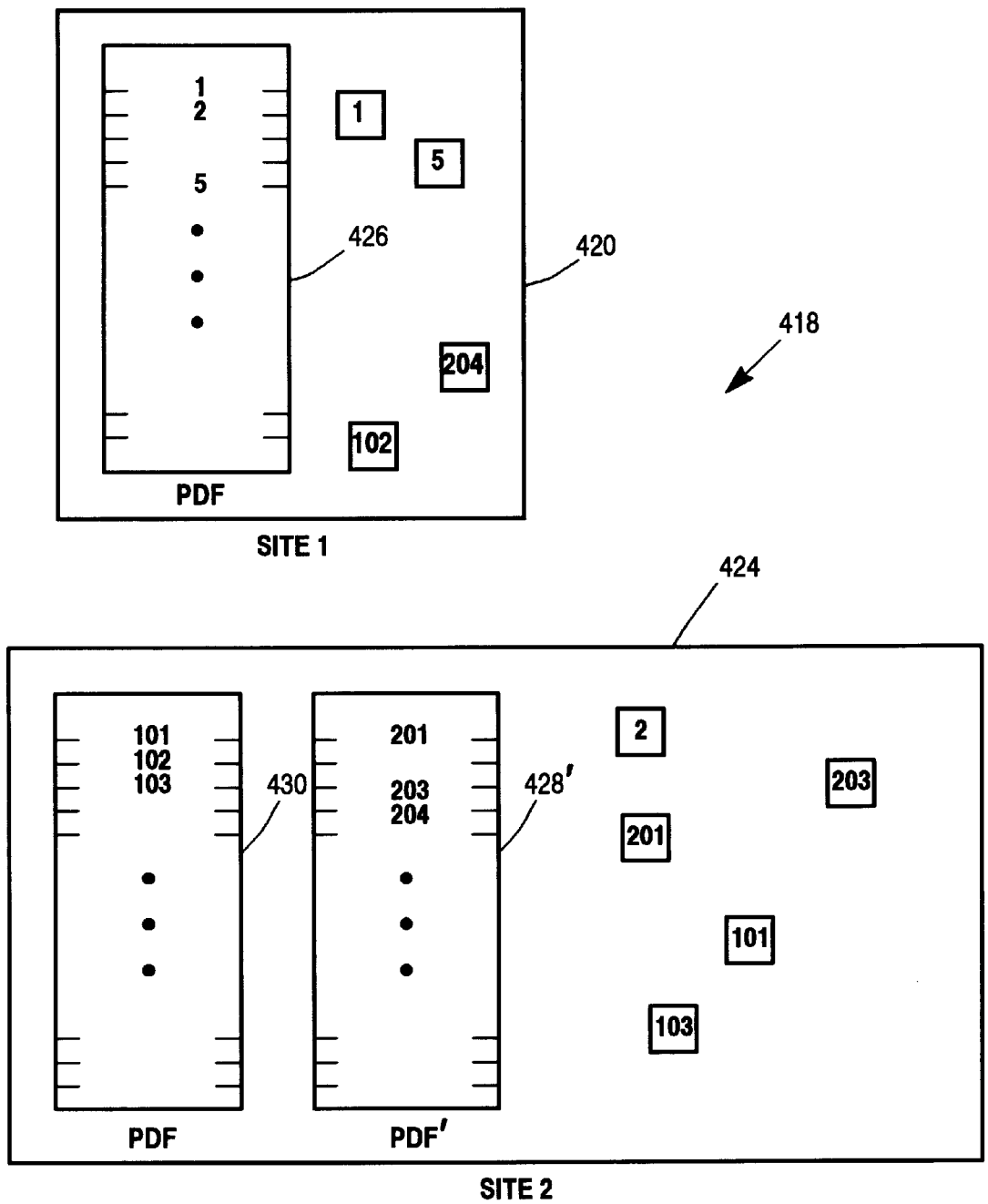

Moreover, in accordance with the failure recovery process, the respective Pms on the surviving sites, site 420 and site 424, attempt to contact each process identified by a PID in the respective PDFs, PDF 426, PDF 430 and reconstructed PDF 428', that they manage. For instance, each respective PM may send a ping message to each process identified by a PID in its respective PDF. Any process that fails to respond is assumed to have been active on the failed site, and its PID is removed from the respective PDF that stored it. Referring to FIG. 11B, the PM on site 420 cannot contact processes corresponding to PID 3 and PID 4 since they had been running on the failed site 422. So, the PIDs for these processes are removed from PDF 426. Similarly, the PM on site 424 cannot contact the processes identified by PID 104, and the PID for this process is removed from PDF 430. Likewise, the PM on site 424 cannot contact the process identified by PID 202, and the PID for that process is removed from the reconstructed PDF 428'.

Resume

We have described the following systems and related methods: multi computers with serverized distributed operating system with directory incidents and related message handling, and where no local slot is available; and related process migration; and with global atomic operation and with failure recovery.

While a particular embodiment of the invention has been described in detail, various modifications to the preferred embodiment can be made without departing from the spirit and scope of the invention. For example, although the current embodiment employs a CHORUS microkernel and UNIX SSUs, the invention can be implemented with other operating system components as well. Thus, the invention is limited only by the appended claims.

What is claimed is:

1. A method for creation of a process in a multicomputer system which includes multiple sites interconnected by high speed digital links, each site including a local processor and local memory and local serverized operating system which includes a local process manager server addressable through an associated process manager port identifier, the system further including a messaging facility for controlling the transfer of messages between different processes operative on different sites of the system, the method comprising the steps of:

providing a process directory structure distributed across multiple sites such that different site memories include different fragments of the process directory structure, such fragmented process directory structure including a multiplicity of slots for referencing a multiplicity of process port identifiers;

providing a process directory port group structure in site memory of at least one of the sites which references respective port identifiers associated with respective process managers operative on respective sites for which respective process directory fragments include unallocated slots;

providing a process directory port group manager operative on at least one of the sites;

issuing call to a respective process manager server, such call requesting a create a new process operation;

transferring a first message from the respective process manager receiving the call to the process directory port group manager, such first message requesting allocation of a slot;

transferring a second message from the process directory port group manager to a process manager associated with one of the port identifiers stored in the process directory port group structure, such second message requesting to allocate a slot in the process directory fragment of such process manager receiving such second message;

completing the new process creation operation on the site that contains the process manager receiving the call requesting a create a new process operation; and providing a reference to a new process port identification associated with the new process in a slot of the process directory fragment on the site of process manager receiving the second message.

2. The method of claim 1, wherein said step of providing a reference to a new process port identification for the new process involves providing such reference in a process directory structure fragment slot on a site other than the site of the process manager receiving the call requesting a create a new process operation.

3. The method of claim 2, and including the further step of:

providing a new process structure associated in site memory with the new process, such new process structure providing a reference to the other site which includes the slot with the reference t the new process port identification.

4. The method of claim 1, wherein the process directory port group structure does not include the port identifier associated with the process manager receiving the call requesting a create anew process operation; and wherein said step of providing a reference to a new process port identification involves providing such reference in a process directory structure fragment slot on a site other than the site of the process manager receiving the call requesting a create a new process operation.

5. The method of claim 1, wherein the process directory port group structure does not include the port identifier associated with the process manager receiving the call requesting a create anew process operation;

wherein said step of providing a reference to a new process port identification involves providing such reference in a process directory structure fragment slot on a site other than the site of the process manager receiving the call requesting a create a new process operation; and including the further step of:

providing a new process structure associated in site memory with the new process such new process structure providing a reference to the other site which includes the slot with the reference to the new process port identification.

* * * * *